United States Patent
Yamamoto (10) Patent No.: US 7,362,068 B2
(45) Date of Patent: Apr. 22, 2008

(54) CLOSING MEMBER CONTROL SYSTEM

(75) Inventor: Motoya Yamamoto, Hamamatsu (JP)

(73) Assignee: Asmo Co., Ltd., Shizuoka-pref. (JP)

( * ) Notice: Subject to any disclaimer, the term of this patent is extended or adjusted under 35 U.S.C. 154(b) by 277 days.

(21) Appl. No.: 10/893,962

(22) Filed: Jul. 20, 2004

(65) Prior Publication Data
US 2005/0017667 A1    Jan. 27, 2005

(30) Foreign Application Priority Data
Jul. 23, 2003    (JP)    ............... 2003-278381

(51) Int. Cl.
*G05B 5/00*    (2006.01)

(52) U.S. Cl. .............. 318/469; 318/283; 318/266; 318/286; 318/285; 318/466; 318/282; 318/433; 49/28; 49/31; 49/26

(58) Field of Classification Search ........ 318/466–469, 318/280–286
See application file for complete search history.

(56) References Cited

U.S. PATENT DOCUMENTS

| | | | | |
|---|---|---|---|---|
| 4,328,451 A | * | 5/1982 | Barge ........................ 318/596 |
| 4,347,465 A | * | 8/1982 | Goertler et al. ............. 318/266 |
| 4,468,596 A | * | 8/1984 | Kinzl et al. ................ 318/287 |
| 4,641,067 A | * | 2/1987 | Iizawa et al. ............... 318/287 |
| 4,686,598 A | * | 8/1987 | Herr .......................... 361/31 |
| 4,709,196 A | * | 11/1987 | Mizuta ....................... 318/282 |
| 4,746,845 A | * | 5/1988 | Mizuta et al. .............. 318/286 |
| 4,900,994 A | * | 2/1990 | Mizuta ....................... 318/283 |
| 5,012,168 A | * | 4/1991 | Dara et al. .................. 318/434 |
| 5,351,439 A | * | 10/1994 | Takeda et al. ................ 49/28 |
| 5,399,950 A | * | 3/1995 | Lu et al. ..................... 318/565 |
| 5,404,673 A | * | 4/1995 | Takeda et al. ................ 49/28 |
| 5,422,551 A | * | 6/1995 | Takeda et al. .............. 318/265 |
| 5,436,539 A | * | 7/1995 | Wrenbeck et al. .......... 318/265 |
| 5,530,329 A | * | 6/1996 | Shigematsu et al. ........ 318/469 |
| 5,539,290 A | * | 7/1996 | Lu et al. ..................... 318/565 |
| 5,682,090 A | * | 10/1997 | Shigematsu et al. ........ 318/468 |
| 5,723,960 A | * | 3/1998 | Harada ....................... 318/469 |
| 5,801,501 A | * | 9/1998 | Redelberger ................ 318/283 |
| 5,872,436 A | * | 2/1999 | Bergmann et al. .......... 318/286 |
| 5,977,732 A | * | 11/1999 | Matsumoto ................. 318/283 |
| 6,034,495 A | * | 3/2000 | Tamagawa et al. ......... 318/266 |

(Continued)

FOREIGN PATENT DOCUMENTS

JP    A-60-70983    4/1985

(Continued)

*Primary Examiner*—Lincoln Donovan
*Assistant Examiner*—Renata McCloud
(74) *Attorney, Agent, or Firm*—Posz Law Group, PLC (57) ABSTRACT

A controller reduces an output of the drive motor when a window glass reaches a speed shift position, which is between a fully open position and a fully closed position of the window glass, in a closing operation of the window glass. The controller increases the output of the drive motor based on a position signal, which indicates that the position of the closing member in the closing operation is in a preclosed position located on a fully closed position side of the speed shift position. The preclosed position is located in a pinch-monitoring disabled zone, in which the monitoring of the pinching of the object through the controller is disabled.

12 Claims, 6 Drawing Sheets

U.S. PATENT DOCUMENTS

| | | | | |
|---|---|---|---|---|
| 6,064,165 | A * | 5/2000 | Boisvert et al. | 318/465 |
| 6,166,508 | A * | 12/2000 | Kalb | 318/632 |
| 6,236,176 | B1 * | 5/2001 | Uebelein et al. | 318/287 |
| 6,347,482 | B1 * | 2/2002 | Takiguchi et al. | 49/28 |
| 6,753,669 | B2 * | 6/2004 | Spreng et al. | 318/469 |
| 6,788,016 | B2 * | 9/2004 | Whinnery | 318/468 |
| 6,822,410 | B2 * | 11/2004 | Whinnery et al. | 318/469 |

FOREIGN PATENT DOCUMENTS

| | | |
|---|---|---|
| JP | A-2001-193351 | 7/2001 |
| JP | A-2002-242534 | 8/2002 |
| JP | A-2002-327574 | 11/2002 |

* cited by examiner

P1 (FULLY CLOSED POSIT.)
P2 (PRECLOSED POSIT.)
P3 (SPEED SHIFT POSIT.)

P4 (FULLY OPEN POSIT.)

CLOSING MEMBER CONTROL SYSTEM

CROSS REFERENCE TO RELATED APPLICATION

This application is based on and incorporates herein by reference Japanese Patent Application No. 2003-278381 filed on Jul. 23, 2003.

BACKGROUND OF THE INVENTION

1. Field of the Invention

The present invention relates to a closing member control system, such as a power window system for closing and opening a vehicle window glass or a sunroof system for closing and opening a roof glass.

2. Description of Related Art

One previously proposed vehicle power window system has a protective function for limiting pinching of an object by a window glass. In order to reduce the pinching load applied to the pinched object from the window glass, the vehicle power window system changes the closing speed of the window glass from the normal speed to a reduced speed at a location near a fully closed position of the window glass until the window glass reaches the fully closed position. Such a power window system is disclosed in, for example, Japanese Unexamined Patent Publication No. 2002-327574. In the power window system disclosed in Japanese Unexamined Patent Publication No. 2002-327574, when the rotational speed of a drive motor, which drives the window glass, drops below a predetermined value just before reaching the fully closed position, the output of the drive motor is increased to the high power.

However, in the above case where the output of the drive motor is increased upon dropping of the rotational speed of the drive motor below the predetermined value, the position of the window glass at the time of changing the output of the drive motor to the high power varies from product to product. Thus, tactile perception of an operator of the power window system disadvantageously varies from product to product.

SUMMARY OF THE INVENTION

The present invention addresses the above disadvantage. Thus, it is an objective of the present invention to provide a closing member control system, which can minimize a variation in the tactile perception of an operator of the closing member control system from product to product.

To achieve the objective of the present invention, there is provided a closing member control system, which includes a drive motor, a pinching control means, a position sensing means and a motor output control means. The drive motor drives a closing member between a fully open position and a fully closed position. The pinching control means is for monitoring pinching of an object by the closing member in a closing operation of the closing member toward the fully closed position and is also for controlling the drive motor in a manner that enables release of the object from the closing member upon occurrence of the pinching of the object by the closing member. The pinching control means determines that the object is pinched by the closing member when the drive motor is decelerated in the closing operation of the closing member, and thereby a change in a rotational speed of the drive motor per unit time decreases below a threshold value in the closing operation. The position sensing means is for sensing a current position of the closing member. The motor output control means is for controlling an output of the drive motor. The motor output control means reduces the output of the drive motor when the closing member reaches a first intermediate position, which is between the fully open position and the fully closed position, in the closing operation of the closing member. The motor output control means increases the output of the drive motor based on a position signal, which is received from the position sensing means and which indicates that the position of the closing member in the closing operation is in a second intermediate position located on a fully closed position side of the first intermediate position. The second intermediate position is located in a pinch-monitoring disabled zone, in which the monitoring of the pinching of the object through the pinching control means is disabled.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

First Embodiment

A first embodiment of the present invention will be described with reference to FIGS. 1 to 4.

Figure 1:
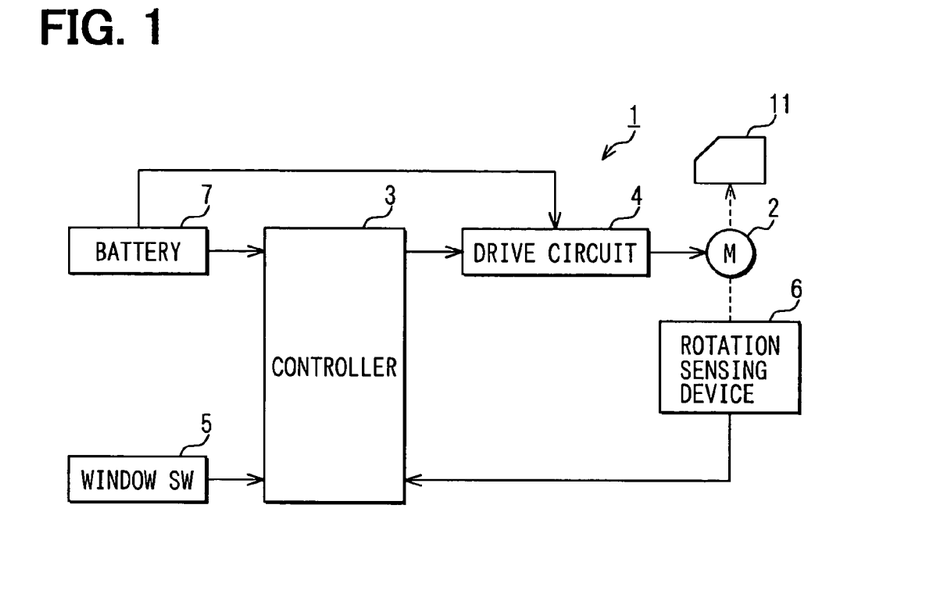
FIG. 1 is a block diagram showing an electrical structure of a vehicle power window system according to a first embodiment.
Figure 2:
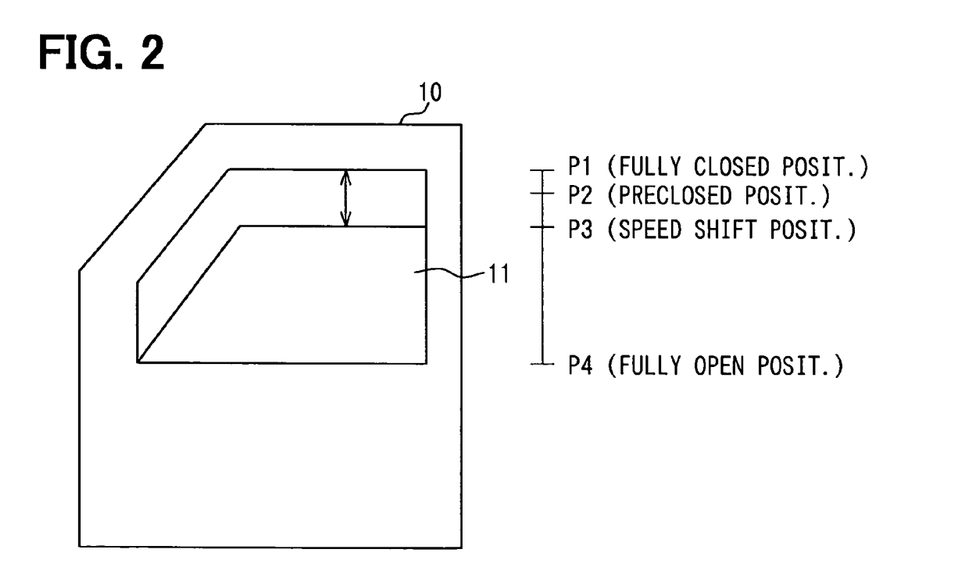
FIG. 2 is a descriptive view showing various operational positions of a window glass of the vehicle power window system of the first embodiment.

In a power window system (a closing member control system) 1 of FIG. 1, a window glass 11, which serves as a closing member, is arranged in a vehicle side door 10 of FIG. 2. The window glass 11 is raised or lowered, i.e., is closed or opened through rotation of a drive motor 2. The power window system 1 includes the drive motor 2, a controller 3, a drive circuit 4, a window switch (window SW) 5 and a rotation sensing device 6, each of which is arranged at a corresponding predetermined position in the vehicle. The controller 3 constitutes a pinching control means, a position sensing means and a motor output control means. The window switch 5 serves as a closing/opening operation commanding means. The rotation sensing device 6 also constitutes the position sensing means. Required electric power is supplied to the controller 3 from a vehicle battery 7. Also, required electric power for driving the drive motor 2 is supplied to the drive circuit 4 from the battery 7.

When the electric power is supplied from the drive circuit 4 to the drive motor 2 based on the control operation of the controller 3, the drive motor 2 is driven to raise or lower, i.e., to close or open the window glass 11 through a window regulator (not shown). The rotation sensing device 6 is installed integrally in the drive motor 2.

The rotation sensing device 6 generates a pulse signal, which is synchronized with rotation of the drive motor 2. The pulse signal is outputted from the rotation sensing device 6 to the controller 3. The rotation sensing device 6 includes, for example, two Hall elements, each of which outputs a corresponding pulse signal synchronized with rotation of the drive motor 2. The Hall elements are constructed to provide a phase difference between the pulse signal of one of the Hall elements and the pulse signal of the other one of the Hall elements.

The controller 3 senses a rotational speed (a rotational period) of the drive motor 2 based on a length of the period of the inputted pulse signal. The controller 3 also senses a rotational direction of the drive motor 2 based on the phase difference between the pulse signals outputted from the Hall elements, respectively. Furthermore, the controller 3 senses a moving speed of the window glass 11 based on the rotational speed (the rotational period) of the drive motor 2. Also, the controller 3 senses the moving direction of the window glass 11 based on the rotational direction of the drive motor 2. In addition, the controller 3 counts the number of the pulse signals based on an edge of each pulse signal to generate a count value. Based on the count value, the controller 3 senses a fully closed position P1, a preclosed position P2, a speed shift position P3 and a fully open position P4 of the window glass 11. The count value is zero when the window glass 11 is located in the fully closed position P1. When the window glass 11 is moved toward the fully open position P4 in an opening operation, the count value is incremented. In contrast, when the window glass 11 is moved toward the fully closed position P1 in a closing operation, the count value is decremented. In the closing operation, when the window glass 11 is located in the fully closed position P1, the count value becomes zero once again.

Various command signals are inputted from the window switch 5 to the controller 3 to close or open, i.e., to raise or lower the window glass 11. The window switch 5 is operated to perform the closing or opening operation of the window glass 11. The window switch 5 can be a rocker switch, a lever switch, a toggle switch or the like. In the case of the rocker switch, when the rocker switch is rocked in one direction, one end of the rocker switch is depressed. Also, when the rocker switch is rocked in the other direction, the other end of the rocker switch is depressed. Each end of the rocker switch can be depressed to two operational positions. Furthermore, the rocker switch includes an opening switch part, a closing switch part and an automatic switch part.

More specifically, when the one end of the window switch 5 is depressed to a first operational position, the opening switch part of the window switch 5 is turned on to output a normal opening operation command signal to the controller 3. Upon outputting of the normal opening operation command signal to the controller 3, a normal opening operation of the window glass 11 is performed to lower the window glass 11 as long as the opening switch part of the window switch 5 is turned on. When the other end of the window switch 5 is depressed to a first operational position, the closing switch part of the window switch 5 is turned on to output a normal closing operation command signal to the controller 3. Upon outputting of the normal closing operation command signal to the controller 3, a normal closing operation of the window glass 11 is performed to raise the window glass 11 as long as the closing switch part of the window switch 5 is turned on. When the one end of the window switch 5 is depressed to a second operational position beyond the first operational position, both of the opening switch part and the automatic switch part of the window switch 5 are turned on, so that the window switch 5 outputs an automatic opening operation command signal to the controller 3. Upon outputting of the automatic opening operation command signal from the window switch 5 to the controller 3, an automatic opening operation of the window glass 11 is performed to open the window glass 11 all the way to the fully open position P4 even when the one end of the window switch 5 is released from the second operational position. When the other one end of the window switch 5 is depressed to a second operational position beyond the first operational position, both of the closing switch part and the automatic switch part of the window switch 5 are turned on, so that the window switch 5 outputs an automatic closing operation command signal to the controller 3. Upon outputting of the automatic closing operation command signal from the window switch 5 to the controller 3, an automatic closing operation of the window glass 11 is performed to close the window glass 11 all the way to the fully closed position P1 even when the other end of the window switch 5 is released from the second operational position.

Upon receiving the normal opening operation command signal from the window switch 5, the controller 3 drives the drive motor 2 through the drive circuit 4 to perform the normal opening operation of the window glass 11 as long as the normal opening operation command signal is received from the window switch 5, i.e., as long as the window switch 5 is operated. Thus, the window glass 11 is opened through the normal opening operation. Upon receiving the normal closing operation command signal from the window switch 5, the controller 3 drives the drive motor 2 through the drive circuit 4 to perform the normal closing operation of the window glass 11 as long as the normal closing operation command signal is received from the window switch 5, i.e., as long as the window switch 5 is operated. Thus, the window glass 11 is closed through the normal closing operation. Upon receiving the automatic opening operation command signal from the window switch 5, the controller 3 drives the drive motor 2 through the drive circuit 4 to perform the automatic opening operation of the window glass 11 and thereby to automatically open the window glass 11 all the way to the fully open position P4. Thus, the window glass 11 is automatically opened to the fully open position P4 through the automatic opening operation. Upon receiving the automatic closing operation command signal from the window switch 5, the controller 3 drives the drive motor 2 through the drive circuit 4 to perform the automatic closing operation of the window glass 11 and thereby to automatically close the window glass 11 all the way to the fully closed position P1. Thus, the window glass 11 is automatically closed to the fully closed position P1 through the automatic closing operation.

At the time of closing operation of the window glass 11 (in each of the normal closing operation and the automatic closing operation of the window glass 11), it is determined whether an object is pinched by the window glass 11 in the controller 3. More specifically, when the object is pinched by the window glass 11, the moving speed of the window glass 11, i.e., the rotational speed of the drive motor 2 is reduced, thereby increasing the rotational period of the drive motor 2. Thus, the controller 3 continuously monitors a change in the rotational speed of the drive motor 2. When a change in the rotational speed of the drive motor 2 per unit time exceeds a predetermined threshold value at the time of pinching the object, the controller 3 determines that the object is pinched by the window glass 11. Then, the controller 3 controls the drive motor 2 to allow release of the pinched object, which is pinched by the window glass 11. In the present embodiment, the controller 3 reverses the rotation of the drive motor 2 to lower the window glass 11 by a predetermined amount to allow release of the pinched object. Alternatively, when the object is pinched, the controller 3 may stop the drive motor 2 to stop the further closing operation of the window glass 11 to allow release of the pinched object.

Furthermore, the controller 3 recognizes all of the fully closed position P1, the preclosed position P2, the speed shift position P3 and the fully open position P4. The preclosed position P2 is located near the fully closed position P1. The speed shift position (a first intermediate position) P3 is a position, which is closer to the fully closed position P1 than the fully open position P4. The preclosed position (a second intermediate position) P2 is set to a position where the pinching of the object by the window glass 11 is not likely to occur beyond that position. Thus, the determination of pinching of the object is cancelled at the preclosed position P2, i.e., the monitoring of the pinching of the object through the controller 3 is disabled at the preclosed position P2. Therefore, the preclosed position P2 is located in a pinch-monitoring disabled zone, in which the monitoring of the pinching of the object through the controller 3 is disabled. For example, the preclosed position P2 may be at or adjacent to a resistance increasing point, at which the window glass 11 begins to contact a weather strip (not shown), so that a resistance applied to the window glass 11 is increased. The controller 3 changes the speed of the drive motor 2 from a normal speed to a low speed to shift the moving speed of the window glass to a low speed in the interval from the speed shift position P3 to the preclosed position P2 in the closing operation of the window glass 11.

Figure 3:
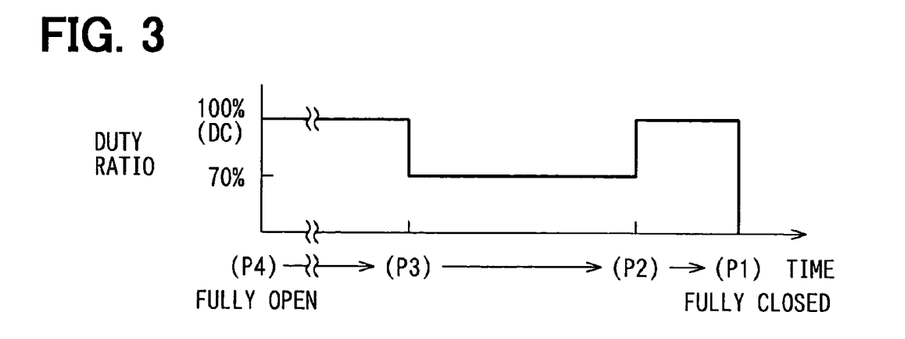
FIG. 3 is a wave form diagram for describing a duty ratio shifting process according to the first embodiment.

More specifically, the controller 3 performs the speed control of the drive motor 2 through duty control (PWM control). Although not depicted, the controller 3 supplies the electric power to the drive motor 2 at the duty ratio (Duty) of 100% to operate the drive motor 2 at the normal speed throughout the entire operational interval (i.e., a P1 to P4 interval) in the opening operation of the window glass 11. When the duty ratio is set to 100%, the drive motor 2 is said to be operated at a normal output. With reference to FIG. 3, the controller 3 supplies the electric power to the drive motor 2 at the duty ratio (Duty) of 100% to operate the drive motor 2 at the normal speed in each of an interval from the fully open position P4 to the speed shift position P3 (i.e., a P4 to P3 interval) and also in an interval from the preclosed position P2 to the fully closed position P1 (i.e., a P2 to P1 interval). In contrast, the controller 3 supplies the electric power to the drive motor 2 at the duty ratio (Duty) of 70% to operate the drive motor 2 at a low speed in an interval from the speed shift position P3 to the preclosed position P2 (i.e., a P3 to P2 interval).

Figure 4:
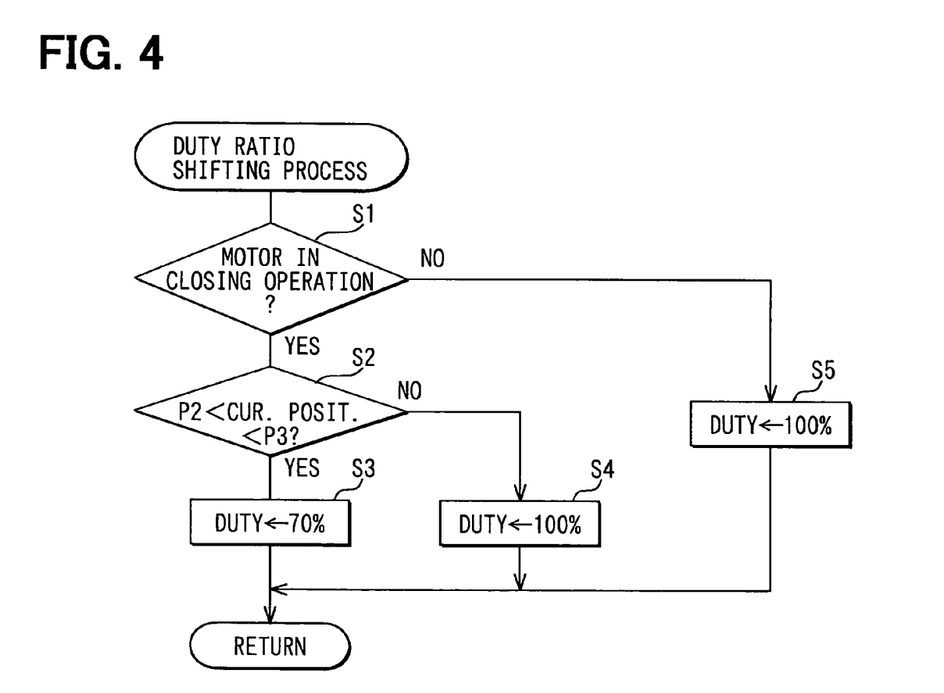
FIG. 4 is a flowchart showing the duty ratio shifting process of the first embodiment.

The above duty ratio shifting process of the controller 3 is performed according to a flowchart shown in FIG. 4. It should be noted that the controller 3 performs the duty ratio shifting process at predetermined intervals from the beginning of the operation of the drive motor 2 until the termination of the operation of the drive motor 2.

At step S1, it is determined whether the drive motor 2 is operated to close the window glass 11, i.e., whether the drive motor 2 is in the closing operation. When it is determined that the drive motor 2 is operated to close the window glass 11, control proceeds to step S2.

At step S2, it is determined whether the current operational position of the window glass 11 in the closing operation is in the P3 to P2 interval. When it is determined that the current operational position of the window glass 11 is in the P3 to P2 interval, control proceeds to step S3. When the current operational position of the window glass 11 is in the P3 to P2 interval, the controller 3 supplies the electric power to the drive motor 2 at the duty ratio of 70% to close the window glass 11 at the low speed at step S3.

When it is determined that the current operational position of the window glass 11 in the closing operation is not in the P3 to P2 interval at step S2, control proceeds to step S4. When the current operational position of the window glass 11 in the closing operation is out of the P3 to P2 interval, i.e., when the current operational position of the window glass 11 in the closing operation is in the P4 to P3 interval or in the P2 to P1 interval, the controller 3 supplies the electric power to the drive motor 2 at the duty ratio (Duty) of 100% to close the window glass 11 at the normal speed at step S4.

When it is determined that the drive motor 2 is not operated to close the window glass 11 at step S1, i.e., when it is determined that the drive motor 2 is operated to open the window glass 11, control proceeds to step S5. At step S5, the controller 3 supplies the electric power to the drive motor 2 at the duty ratio (Duty) of 100% to operate the drive motor 2 at the normal speed throughout the entire operational interval (i.e., a P1 to P4 interval) in the opening operation of the window glass 11.

As discussed above, the controller 3 of the first embodiment supplies the electric power to the drive motor 2 at the duty ratio (Duty) of 100% to operate the drive motor 2 at the normal speed throughout the entire operational interval (i.e., a P1 to P4 interval) in the opening operation of the window glass 11. Furthermore, the controller 3 supplies the electric power to the drive motor 2 at the duty ratio (Duty) of 100% to operate the drive motor 2 at the normal speed in the P4 to P3 interval in the closing operation of the window glass 11. The controller 3 supplies the electric power to the drive motor 2 at the duty ratio (Duty) of 70% to operate the drive motor 2 at the low speed in the P3 to P2 interval in the closing operation of the window glass 11. The controller 3 supplies the electric power to the drive motor 2 at the duty ratio (Duty) of 100% to operate the drive motor 2 at the normal speed in the P2 to P1 interval in the closing operation of the window glass 11.

That is, the controller 3 operates the drive motor 2 at the low speed in the latter half of the closing operation of the window glass 11 to reduce the pinching load applied to the pinched object from the window glass 11 and also to give high grade impression to the user with respect to the way the window glass 11 is operated i.e., to impress the user. However, at the end of the closing operation of the window glass 11, a relatively large force is required to overcome the resistance of, for example, the weather strip (not shown). Thus, the controller 3 changes the duty ratio to 100% in the P2 to P1 interval to increase the output of the drive motor 2. In this way, the closing force of the window glass 11 is increased to effectively and completely close the window glass 11. In this case, the shift of the duty ratio (Duty) for increasing the output of the drive motor 2 is initiated when the window glass 11 in the closing operation reaches the preclosed position P2. Thus, in comparison to the prior art, in which the output of the drive motor is increased at the time of dropping the rotational speed of the drive motor below the predetermined value, it is possible to minimize the variation in the tactile perception of the operator of the power window system from product to product.

As discussed above, the present embodiment provides the following advantages.

(1) When the window glass 11, which is driven by the drive motor 2 in the closing operation, is positioned in the speed shift position P3 in the closing operation of the drive motor 2, the controller 3 reduces the output of the drive motor 2 to reduce the moving speed of the window glass 11 to the low speed. When the window glass 11 is positioned in the preclosed position P2, which is closer to the fully closed position P1 than the speed shift position P3, the controller 3 increases the output of the drive motor 2. In this way, the shift of the output of the motor 2 to the high output is performed when the window glass 11 in the closing operation reaches the preclosed position P2. Thus, in comparison to the prior art, in which the output of the drive motor is increased at the time of dropping the rotational speed of the drive motor below the predetermined value, it is possible to minimize the variation in the tactile perception of the operator of the power window system from product to product.

(2) The preclosed position P2, at which the determination of the pinching of the object by the window glass 11 is cancelled, is located near the fully closed position P1. The output of the drive motor 2 is shifted from the low output to the high output at the preclosed position P2. Thus, at the time of occurrence of the pinching of the object by the window glass 11, the output of the drive motor 2 is reduced to the low output. Then, at the time of fully closing the window glass 11, the output of the drive motor 2 is increased to the high output. In this way, the pinching load applied to the pinched object from the window glass 11 is reduced, and the window glass 11 can be effectively and completely closed.

Second Embodiment

Figure 5:
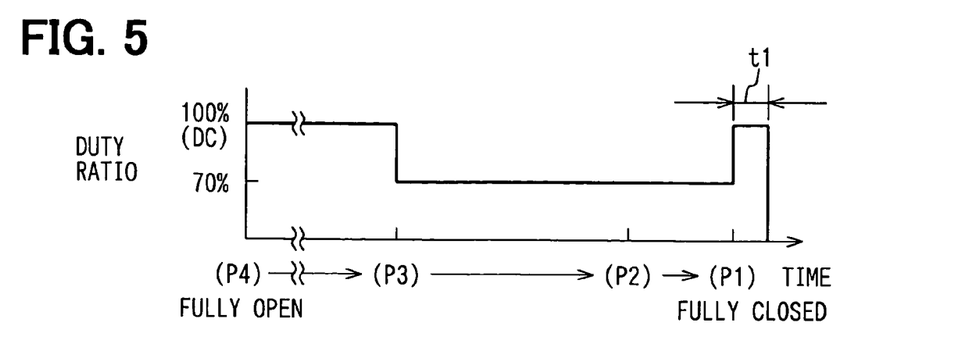
FIG. 5 is a wave form diagram for describing a duty ratio shifting process according to a second embodiment.

A second embodiment of the present invention will be described with reference to FIGS. 5 and 6. In the second embodiment, the duty ratio shifting process of the controller 3 slightly differs from that of the first embodiment. Thus, the following description will be mainly focused on the duty ratio shifting process of the controller 3.

The controller 3 supplies the electric power to the drive motor 2 at the duty ratio (Duty) of 100% to operate the drive motor 2 at the normal speed throughout the entire operational interval (i.e., a P1 to P4 interval) in the opening operation of the window glass 11. Furthermore, with reference to FIG. 5, the controller 3 supplies the electric power to the drive motor 2 at the duty ratio (Duty) of 100% to operate the drive motor 2 at the normal speed in the interval from the fully open position P4 to the speed shift position P3 (the P4 to p3 interval). Also, the controller 3 supplies the electric power to the drive motor 2 at the duty ratio (Duty) of 100% in a predetermined time period t1, also referred to as a principal predetermined time period, which begins when the controller 3 senses a locked state of the drive motor 2. The drive motor 2 is locked when the window glass 11 reaches the fully closed position P1. Thus, the controller 3 senses the locked state of the drive motor 2 to determine the time of arrival of the window glass 11 to the fully closed position P1. In contrast, the controller 3 supplies the electric power to the drive motor 2 at the duty ratio (Duty) of 70% in the interval from the speed shift position P3 to the fully closed position P1 (the P3 to P1 interval) in the closing operation of the window glass 11.

Figure 6:
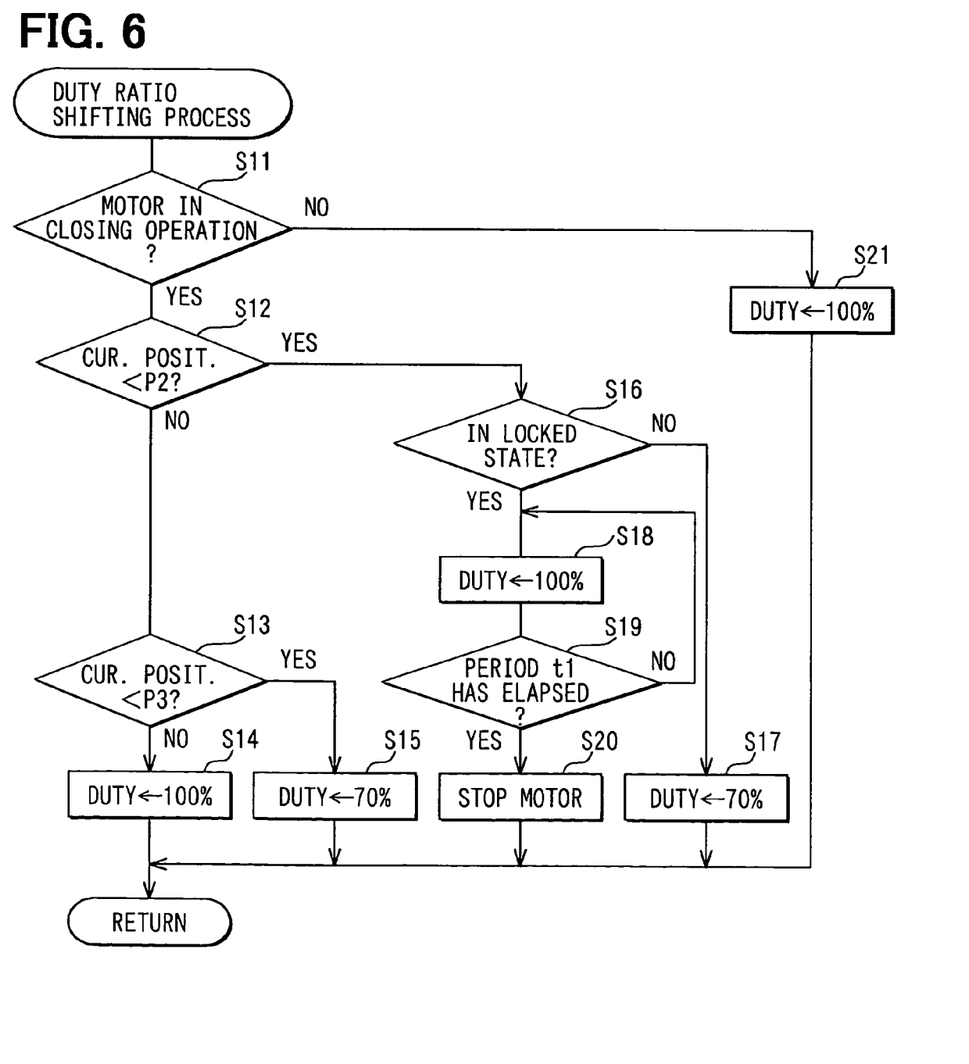
FIG. 6 is a flowchart showing the duty ratio shifting process of the second embodiment.

The above duty ratio shifting process of the controller 3 is performed according to a flowchart shown in FIG. 6. It should be noted that the controller 3 performs the duty ratio shifting process at predetermined intervals from the beginning of the operation of the drive motor 2 until the termination of the operation of the drive motor 2.

At step S11, it is determined whether the drive motor 2 is operated to close the window glass 11. When it is determined that the drive motor 2 is operated to close the window glass 11, control proceeds to step S12.

At step S12, it is determined whether the current operational position of the window glass 11 in the closing operation is in the interval from the preclosed position P2 to the fully closed position P1. At step S12, when it is determined that the current operational position of the window glass 11 in the closing operation is not in the interval from the preclosed position P2 to the fully closed position P1, i.e., when it is determined that current operational position of the window glass 11 is in the interval from the fully open position P4 to the preclosed position P2, the control proceeds to step S13.

At step S13, it is determined whether the current operational position of the window glass 11 in the closing operation is in the interval from the speed shift position P3 to the fully closed position P1. When it is determined that the current operational position of the window glass 11 in the closing operation is not in the interval from the speed shift position P3 to the fully closed position P1, i.e., when it is determined that the current operational position of the window glass 11 is in the P4 to P3 interval, control proceeds to step S14. At step S14, the controller 3 supplies the electric power to the drive motor 2 at the duty ratio (Duty) of 100% to close the window glass 11 at the normal speed in the P4 to P3 interval.

In contrast, at step S13, when it is determined that the current operational position of the window glass 11 in the closing operation is in the interval from the speed shift position P3 to the fully closed position P1, i.e., when it is determined that the current operational position of the window glass 11 is in the P3 to P2 interval, control proceeds to step S15. At step S15, the controller 3 supplies the electric power to the drive motor 2 at the duty ratio (Duty) of 70% to close the window glass 11 at the low speed in the P3 to P2 interval.

At step S12, when it is determined that the current operational position of the window glass 11 in the closing operation is in the interval from the preclosed position P2 to the fully closed position P1, control proceeds to step S16.

At step S16, it is determined whether the drive motor 2 is in the locked state upon the arrival of the window glass 11 to the fully closed position P1. The locked state of the drive motor 2 is sensed by the controller 3, for example, when the pulse signal, which is supplied from the rotation sensing device 6 to the controller 3 and is synchronized with the rotation of the drive motor 2, does not show a substantial change beyond a predetermined time period. At step S16, when it is determined that the drive motor 2 is not in the locked state, and thus the window glass 11 has not reached the fully closed position P1, i.e., when it is determined that the current operational position of the window glass 11 is in the P2 to P1 interval, control proceeds to step S17. In the P2 to P1 interval, the controller 3 supplies the electric power to the drive motor 2 at the duty ratio (Duty) of 70% to close the window glass 11 at the low speed at step S17.

At step S16, when it is determined that the drive motor 2 is in the locked state upon the arrival of the window glass 11 to the fully closed position P1, control proceeds to step S18. At step S18, the controller 3 supplies the electric power to the drive motor 2 at the duty ratio (Duty) of 100%. Then, control proceeds to step S19.

At step S19, it is determined whether the predetermined time period t1 has elapsed since the time of sensing the locked state of the drive motor 2. When it is determined that the predetermined time period t1 has not elapsed since the time of sensing the locked state of the drive motor 2, control returns to step S18. At step S18, the controller 3 maintains the duty ratio (Duty) of 100%. Then, control proceeds to step S19. At step S19, when it is determined that the predetermined time period t1 has elapsed since the time of sensing the locked state of the drive motor 2, control proceeds to step S20. At step S20, the supply of the electric power to the drive motor 2 is stopped to stop the drive motor 2. That is, in steps S18 to S20, the controller 3 supplies the electric power to the drive motor 2 at the duty ratio (Duty) of 100% in the predetermined time period t1, which begins when the controller 3 senses the locked state of the drive motor 2 upon the arrival of the window glass 11 to the fully closed position P1.

At step S11, when it is determined that the drive motor 2 is not operated to close the window glass 11, i.e., when it is determined that the drive motor 2 is operated to open the window glass 11, control proceeds to step S21. At step S21, the controller 3 supplies the electric power to the drive motor 2 at the duty ratio (Duty) of 100% to open the window glass at the normal speed throughout the entire operational interval (i.e., a P1 to P4 interval) in the opening operation of the window glass 11.

As discussed above, the controller 3 of the second embodiment supplies the electric power to the drive motor 2 at the duty ratio (Duty) of 100% to operate the drive motor 2 at the normal speed throughout the entire operational interval (i.e., a P1 to P4 interval) in the opening operation of the window glass 11. Furthermore, the controller 3 supplies the electric power to the drive motor 2 at the duty ratio (Duty) of 100% to operate the drive motor 2 at the normal speed in the P4 to P3 interval in the closing operation of the window glass 11. The controller 3 supplies the electric power to the drive motor 2 at the duty ratio (Duty) of 70% to operate the drive motor 2 at the low speed in the P3 to P1 interval in the closing operation of the window glass 11. The controller 3 supplies the electric power to the drive motor 2 at the duty ratio (Duty) of 100% once again in the predetermined time period t1, which begins when the controller 3 senses the locked state of the drive motor 2 upon the arrival of the window glass 11 to the fully closed position P1.

That is, similar to the first embodiment, even in the second embodiment, the controller 3 operates the drive motor 2 at the low speed in the latter half of the closing operation of the window glass 11 to reduce the pinching load applied to the pinched object from the window glass 11 and also to give high grade impression to the user with respect to the way the window glass 11 is operated. However, at the end of the closing operation of the window glass 11, a relatively large force is required to overcome the resistance of, for example, the weather strip (not shown). Thus, the controller 3 supplies the electric power to the drive motor 2 at the duty ratio (Duty) of 100% once again in the predetermined time period t1, which begins when the controller 3 senses the locked state of the drive motor 2 upon the arrival of the window glass 11 to the fully closed position P1. In this way, even when the drive motor 2 is locked, the drive motor 2 is operated at the high output to provide the closing force to the window glass 11. Thus, the window glass 11 can be effectively and completely closed. In this case, the shift of the duty ratio (Duty) for increasing the output of the drive motor 2 is initiated when the window glass 11 in the closing operation reaches the fully closed position P1. Thus, in comparison to the prior art, in which the output of the drive motor is increased at the time of dropping the rotational speed of the drive motor below the predetermined value, it is possible to minimize the variation in the tactile perception of the operator of the power window system from product to product.

As discussed above, the second embodiment provides the following advantages.

(1) When the window glass 11, which is driven by the drive motor 2 in the closing operation, is positioned in the speed shift position P3, the controller 3 reduces the output of the drive motor 2 to reduce the moving speed of the window glass 11 to the low speed. During the period t1, which begins when the controller 3 senses the locked state of the drive motor 2 upon the arrival of the window glass 11 to the fully closed position P1, the controller 3 increases the output of the drive motor 2 to the high output. In this way, the shift of the output of the drive motor 2 to the high output is performed when the window glass 11 in the closing operation reaches the fully closed position P1. Thus, in comparison to the prior art, in which the output of the drive motor is increased at the time of dropping the rotational speed of the drive motor below the predetermined value, it is possible to minimize the variation in the tactile perception of the operator of the power window system from product to product.

(2) During the predetermined time period t1, which begins when the controller 3 senses the locked state of the drive motor 2 upon the arrival of the window glass 11 to the fully closed position P1, the controller 3 increases the output of the drive motor 2 to the high output. Thus, even when the drive motor 2 is locked, the closing drive force is applied to the window glass 11. As a result, the window glass 11 can be effectively closed. Furthermore, at the time of pinching the object by the window glass 11, the output of the drive motor 2 is reduced to the low output. Thus, the pinching load applied to the pinched object from the window glass 11 is reduced, and the window glass 11 can be more effectively closed.

Third Embodiment

A third embodiment of the present invention will be described with reference to FIGS. 7 and 8. In the third embodiment, the duty ratio shifting process of the controller 3 slightly differs from that of the first embodiment. Thus, the following description will be mainly focused on the duty ratio shifting process of the controller 3.

The controller 3 of the third embodiment supplies the electric power to the drive motor 2 at the duty ratio (Duty) of 100% throughout the entire operational interval (i.e., a P1 to P4 interval) in the opening operation of the window glass 11.

Figure 7:
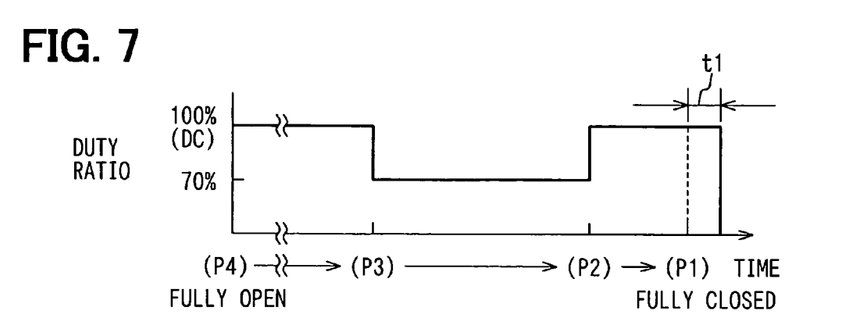
FIG. 7 is a wave form diagram for describing a duty ratio shifting process according to a third embodiment.

Furthermore, with reference to FIG. 7, the controller 3 supplies the electric power to the drive motor 2 at the duty ratio (Duty) of 100% to operate the drive motor 2 at the normal speed in the interval from the fully open position P4 to the speed shift position P3 (the P4 to P3 interval) and also in the interval from the preclosed position P2 to the fully closed position P1 (the P2 to P1 interval) in the closing operation of the window glass 11. In addition, the controller 3 supplies the electric power to the drive motor 2 at the duty ratio (Duty) of 100% in the predetermined time period t1, which begins when the controller 3 senses the locked state of the drive motor 2 upon the arrival of the window glass 11 to the fully closed position P1. The controller 3 supplies the electric power to the drive motor 2 at the duty ratio (Duty) of 70% in the interval from the speed shift position P3 to the preclosed position P2 (the P3 to P2 interval) in the closing operation of the window glass 11.

Figure 8:
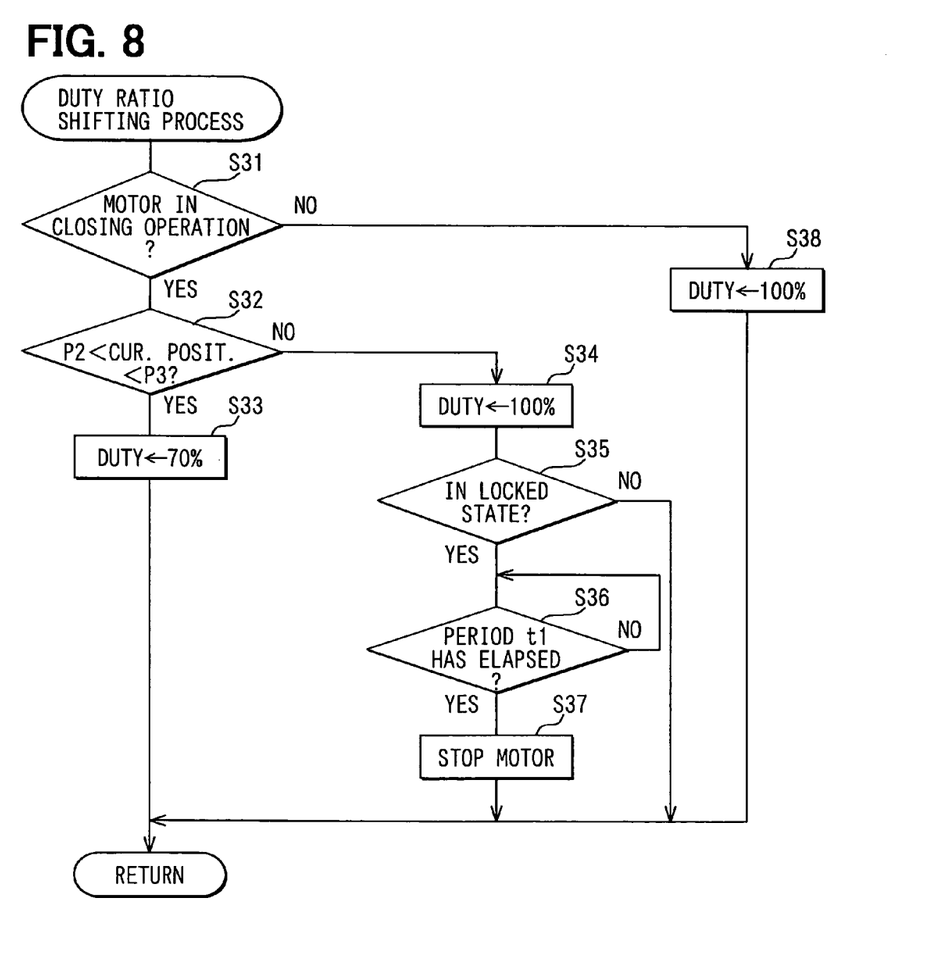
FIG. 8 is a flowchart showing the duty ratio shifting process of the third embodiment.

The above duty ratio shifting process of the controller 3 is performed according to a flowchart shown in FIG. 8. It should be noted that the controller 3 performs the duty ratio shifting process at predetermined intervals from the beginning of the operation of the drive motor 2 until the termination of the operation of the drive motor 2.

At step S31, it is determined whether the drive motor 2 is operated to close the window glass 11. At step S31, when it is determined that the drive motor 2 is operated to close the window glass 11, control proceeds to step S32.

At step S32, it is determined whether the current operational position of the window glass 11 in the closing operation is in the P3 to P2 interval. At step S32, when it is determined that the current operational position of the window glass 11 in the closing operation is in the P3 to P2 interval, control proceeds to step S33. At step S33, the controller 3 supplies the electric power to the drive motor 2 at the duty ratio (Duty) of 70% to reduce the closing speed of the window glass 11 to the low speed in the P3 to P2 interval.

In contrast, at step S32, when it is determined that the current operational position of the window glass 11 in the closing operation is not in the P3 to P2 interval, control proceeds to step S34. At step S34, the controller 3 supplies the electric power to the drive motor 2 at the duty ratio of 100% to close the window glass 11 at the normal speed at the outside of the P3 to P2 interval, i.e., in the P4 to P3 interval and in the P2 to P1 interval. Then, control proceeds to step S35.

At step S35, it is determined whether the drive motor 2 is in the locked state upon the arrival of the window glass 11 to the fully closed position P1. At step S35, when it is determined that the drive motor 2 is not in the locked state, and thus the window glass 11 has not reached the fully closed position P1, i.e., when it is determined that the current operational position of the window glass 11 is in the P4 to P3 interval or in the P2 to P1 interval, the controller 3 maintains the supply of the electric power at the duty ratio of 100%.

In contrast, at step S35, when it is determined that the drive motor 2 is in the locked state upon the arrival of the window glass 11 to the fully closed position P1, control proceeds to step S36.

At step S36, it is determined whether the predetermined time period t1 has elapsed since the time of sensing the locked state of the drive motor 2. At step S36, when it is determined that the predetermined time period t1 has not elapsed since the time of sensing the locked state of the drive motor 2, control repeats step S36. At step S36, when it is determined that the predetermined time period t1 has elapsed since the time of sensing the locked state of the drive motor 2, control proceeds to step S37. At step S37, the supply of the electric power to the drive motor 2 is stopped to stop the drive motor 2. Therefore, in this case, the controller 3 supplies the electric power to the drive motor 2 at the duty ratio (Duty) of 100% in the predetermined time period t1, which begins when the controller 3 senses the locked state of the drive motor 2 upon the arrival of the window glass 11 to the fully closed position P1.

At step S31, when it is determined that the drive motor 2 is not operated to close the window glass 11, i.e., when it is determined that the drive motor 2 is operated to open the window glass 11, control proceeds to step S38. At step S38, the controller 3 supplies the electric power to the drive motor 2 at the duty ratio (Duty) of 100% to open the window glass at the normal speed throughout the entire operational interval (i.e., a P1 to P4 interval) in the opening operation of the window glass 11.

As discussed above, the controller 3 supplies the electric power to the drive motor 2 at the duty ratio of 100% to operate the drive motor 2 at the normal speed in the P1 to P4 interval in the opening operation of the window glass 11. Furthermore, in the closing operation of the window glass 11, the controller 3 supplies the electric power to the drive motor 2 at the duty ratio of 100% to operate the drive motor 2 at the normal speed in the P4 to P3 interval. Furthermore, the controller 3 supplies the electric power to the drive motor 2 at the duty ratio of 70% to operate the drive motor 2 at the low speed in the P3 to P2 interval. Then, the controller 3 supplies the electric power to the drive motor 2 at the duty ratio of 100% once again to operate the drive motor 2 at the normal speed in the P2 to P1 interval. Thereafter, the controller 3 supplies the electric power to the drive motor 2 at the duty ratio (Duty) of 100% in the predetermined time period t1, which begins when the controller 3 senses the locked state of the drive motor 2 upon the arrival of the window glass 11 to the fully closed position P1.

That is, similar to the first embodiment, even in the third embodiment, the controller 3 operates the drive motor 2 at the low speed in the latter half of the closing operation of the window glass 11 to reduce the pinching load applied to the pinched object from the window glass 11 and also to give high grade impression to the user with respect to the way the window glass 11 is operated. However, at the end of the closing operation of the window glass 11, a relatively large force is required to overcome the resistance of, for example, the weather strip (not shown). Thus, the controller 3 supplies the electric power to the drive motor 2 at the duty ratio (Duty) of 100% once again in the P2 to P1 interval to increase the output of the drive motor 2. In this way, the closing force applied to the window glass 11 is increased. Also, the controller 3 supplies the electric power to the drive motor 2 at the duty ratio (Duty) of 100% to maintain the high output of the drive motor 2 during the predetermined time period t1, which begins when the controller 3 senses the locked state of the drive motor 2 upon the arrival of the window glass 11 to the fully closed position P1. In this way, even when the drive motor 2 is locked, the drive motor 2 is operated at the high output to provide the closing force to the window glass 11. Thus, the window glass 11 can be further effectively closed. In this case, the shift of the duty ratio (Duty) for increasing the output of the drive motor 2 is initiated when the window glass 11 in the closing operation reaches the preclosed position P2. Thus, in comparison to the prior art, in which the output of the drive motor is increased at the time of dropping the rotational speed of the drive motor below the predetermined value, it is possible to minimize the variation in the tactile perception of the operator of the power window system from product to product.

As discussed above, the third embodiment provides the following advantages.

(1) The controller 3 reduces the output of the drive motor 2 to reduce the closing speed of the window glass 11 when the window glass 11, which is driven by the drive motor 2 in the closing operation, is positioned in the speed shift position P3. Furthermore, the controller 3 increases the output of the drive motor 2 when the window glass 11 is positioned in the preclosed position P2, which is located between the speed shift position P3 and the fully closed position P1. In this way, the shift of the output of the drive motor 2 to the high output is performed when the window glass 11 in the closing operation reaches the preclosed position P2. Thus, in comparison to the prior art, in which the output of the drive motor is increased at the time of dropping the rotational speed of the drive motor below the predetermined value, it is possible to minimize the variation in the tactile perception of the operator of the power window system from product to product.

(2) During the predetermined time period t1, which begins when the controller 3 senses the locked state of the drive motor 2 upon the arrival of the window glass 11 to the fully closed position P1, the controller 3 increases the output of the drive motor 2 to the high output. Thus, even when the drive motor 2 is locked, the drive motor 2 is still operated at the high output to apply the closing drive force to the window glass 11. As a result, the window glass 11 can be effectively closed.

(3) The determination of pinching of the object is cancelled at the preclosed position P2, which is located near the fully closed position P1. The shift of the output of the drive motor 2 from the low output to the high output is performed when the window glass 11 in the closing operation reaches the preclosed position P2. Thus, the output of the drive motor 2 at the time of pinching the object by the window glass 11 becomes low, and the output of the drive motor 2 at the time of fully closing the window glass 11 becomes high. In this way, the pinching load applied to the pinched object becomes small, and the window glass 11 can be more effectively closed.

Fourth Embodiment

Figure 9:
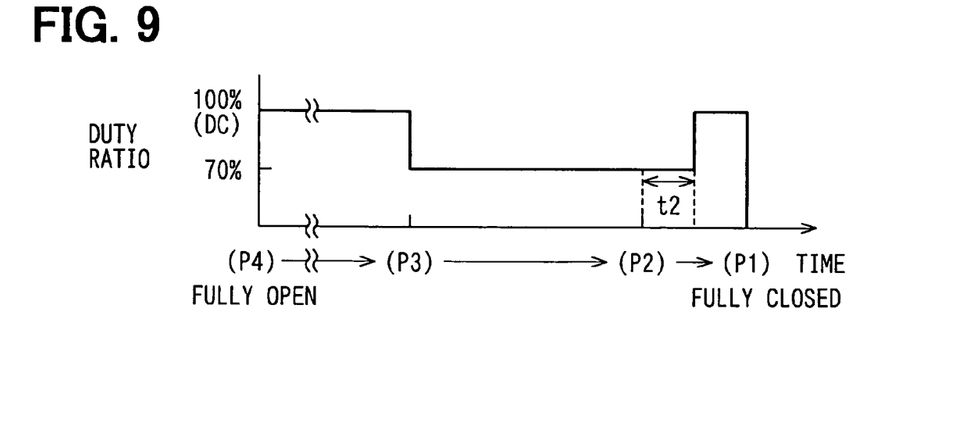
FIG. 9 is a wave form diagram for describing a duty ratio shifting process according to a fourth embodiment.

A fourth embodiment of the present invention will be described with reference to FIGS. 9 and 10.

The controller 3 of the fourth embodiment supplies the electric power to the drive motor 2 at the duty ratio (Duty) of 100% throughout the entire operational interval (i.e., the P1 to P4 interval) in the opening operation of the window glass 11. Furthermore, with reference to FIG. 9, the controller 3 supplies the electric power to the drive motor 2 at the duty ratio (Duty) of 100% in the interval from the fully open position P4 to the speed shift position P3 (the P4 to P3 interval) in the flossing operation of the window glass 11. Also, the controller 3 supplies the electric power to the drive motor 2 at the duty ratio (Duty) of 100% in an interval from an end of a predetermined time period t2, also referred to as the secondary predetermined time period, to the fully closed position P1 in the closing operation of the window glass 11. Here, the predetermined time period t2 begins when the controller 3 senses arrival of the window glass 11 to the preclosed position P2 in the closing operation of the window glass 11. Furthermore, the controller 3 supplies the electric power to the drive motor 2 at the duty ratio of 70% in an interval from the speed shift position P3 to the end of the predetermined time period t2 in the flowing operation of the window glass 11.

Figure 10:
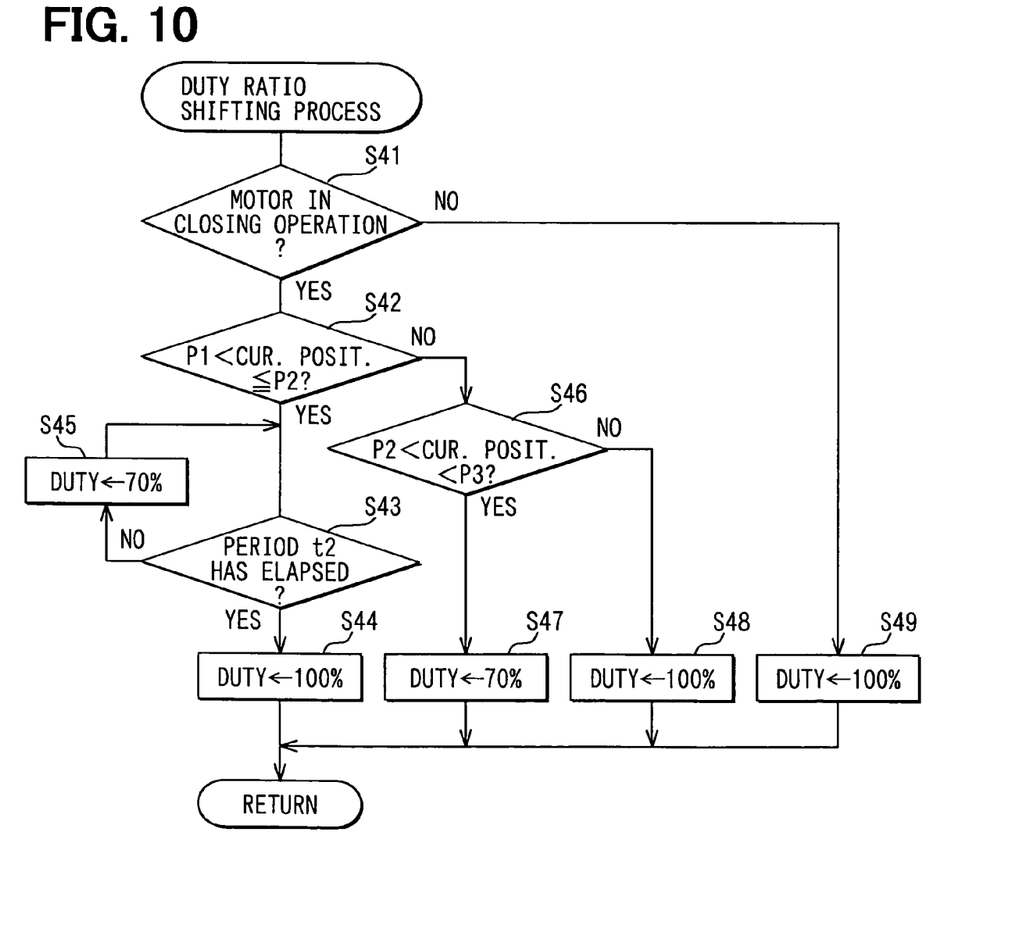
FIG. 10 is a flowchart showing the duty ratio shifting process of the fourth embodiment.

The above duty ratio shifting process of the controller 3 is performed according to a flowchart shown in FIG. 10. It should be noted that the controller 3 performs the duty ratio shifting process at predetermined intervals from the beginning of the operation of the drive motor 2 until the termination of the operation of the drive motor 2.

At step S41, it is determined whether the drive motor 2 is operated to close the window glass 11. When it is determined that the drive motor 2 is operated to close the window glass 11, control proceeds to step S42.

At step S42, it is determined whether the current operational position of the window glass 11 in the closing operation is in the interval from the preclosed position P2 to the fully closed position P1. At step S42, when it is determined that the current operational position of the window glass 11 in the closing operation is in the interval from the preclosed position P2 to the fully closed position P1, control proceeds to step S43.

At step S43, it is determined whether the predetermined time period t2 has elapsed since the time of sensing the arrival of the window glass 11 to the preclosed position P2 in the closing operation of the window glass 11.

At step S43, when it is determined that the predetermined time period t2 has not elapsed since the time of sensing the arrival of the window glass 11 to the preclosed position P2 in the closing operation of the window glass 11, control proceeds to step S45. At step S45, the controller 3 maintains the duty ratio (Duty) at 70%. Then, control returns to step S43. At step S43, when it is determined that the predetermined time period t2 has elapsed since the time of sensing the arrival of the window glass 11 to the preclosed position P2 in the closing operation of the window glass 11, control proceeds to step S44. At step S44, the controller 3 supplies the electric power to the drive motor 2 at the duty ratio (Duty) of 100% to close the window glass 11 at the normal speed.

At step S42, when it is determined that the current operational position of the window glass 11 in the closing operation is not in the interval from the preclosed position P2 to the fully closed position P1, control proceeds to step S46.

At step S46, it is determined whether the current operational position of the window glass 11 in the closing operation is in the interval from the speed shift position P3 to the preclosed position P2 (the P3 to P2 interval). At step S46, when it is determined that the current operational position of the window glass 11 in the closing operation is in the interval from the speed shift position P3 to the preclosed position P2, control proceeds to step S47. At step S47, the controller 3 supplies the electric power to the drive motor 2 at the duty ratio (Duty) of 70% to close the window glass 11 at the low speed in the P3 to P2 interval.

At step S46, when it is determined that the current operational position of the window glass 11 in the closing operation is out of the interval from the speed shift position P3 to the preclosed position P2 (the P3 to P2 interval), i.e., when it is determined that the current operational position of the window glass 11 is in the interval from the fully open position P4 to the speed shift position P3, control proceeds to step S48. At step S48, the controller 3 supplies the electric power to the drive motor 2 at the duty ratio (Duty) of 100% to close the window glass 11 at the normal speed.

At step S41, when it is determined that the drive motor 2 is not operated to close the window glass 11, i.e., when it is determined that the drive motor 2 is operated to open the window glass 11, control proceeds to step S49. At step S49, the controller 3 supplies the electric power to the drive motor 2 at the duty ratio (Duty) of 100% throughout the entire operational interval (i.e., the P1 to P4 interval) in the opening operation of the window glass 11.

As discussed above, the controller 3 supplies the electric power to the drive motor 2 at the duty ratio of 100% to operate the drive motor 2 at the normal speed in the P1 to P4 interval in the opening operation of the window glass 11. Furthermore, in the closing operation of the window glass 11, the controller 3 supplies the electric power to the drive motor 2 at the duty ratio of 70% to operate the drive motor 2 at the low speed in the interval from the speed shift position P3 to the end of the predetermined time period t2. Furthermore, the controller 3 supplies the electric power to the drive motor 2 at the duty ratio of 100% in the interval from the end of the predetermined time period t2 to the fully closed position P1.

That is, similar to the first embodiment, even in the fourth embodiment, the controller 3 operates the drive motor 2 at the low speed in the latter half of the closing operation of the window glass 11 to reduce the pinching load applied to the pinched object from the window glass 11 and also to give high grade impression to the user with respect to the way the window glass 11 is operated. However, at the end of the closing operation of the window glass 11, a relatively large force is required to overcome the resistance of, for example, the weather strip (not shown). Thus, the controller 3 supplies the electric power to the drive motor 2 at the duty ratio (Duty) of 100% once again in the interval from the end of the predetermined time period t2 to the fully closed position P1. In this way, the closing force applied to the window glass 11 is effectively increased after the elapse of the predetermined time period t2, which begins at the time of arrival of the window glass 11 to the preclosed position P2. Thus, in comparison to the prior art, in which the output of the drive motor is increased at the time of dropping the rotational speed of the drive motor below the predetermined value, it is possible to minimize the variation in the tactile perception of the operator of the power window system from product to product.

In the fourth embodiment, it should be noted that the time period t2 is not need to be always the same and can be changed based on an operational condition, such as the closing speed of the window glass 11, which is obtained based on information supplied from the rotation sensing device 6.

Furthermore, the fourth embodiment may be modified like the second or third embodiment. That is, the controller 3 may supply the electric power to the drive motor 2 at the duty ratio (Duty) of 100% in the predetermined time period t1, which begins when the controller 3 senses a locked state of the drive motor 2, if desired.

The above embodiments can be modified as follows.

In each of the above embodiments, the duty ratio (Duty) is rapidly shifted from 100% to 70% in a single step at the speed shift position P3. Alternatively, the duty ratio can be gradually reduced. Also, in each of the above embodiments, the duty ratio is rapidly shifted from 70% to 100% in a single step at the preclosed position P2, at the fully closed position P1 or at the end of the time period t2. Alternatively, the duty ratio can be gradually increased. Also, in each of the above embodiments, 100% and 70% are used as the duty ratios. Alternatively, any other appropriate values can used as the duty ratios. Furthermore, the positions, at each of which the duty ratio is changed from one value to the other value, can be changed to any other appropriate positions. Also, the number of changes of the duty ratios can be any other suitable number.

In each of the above embodiments, the output of the drive motor 2 is controlled through the duty control. However, the output of the drive motor 2 can be controlled through any other ways. For example, the output of the drive motor 2 can be controlled through control of electric current supplied to the drive motor 2.

In each of the above embodiments, the position of the window glass 11 is sensed based on the pulse signal, which is synchronized with the rotation of the drive motor 2. However, the position of the window glass 11 can be sensed through any other appropriate manner.

Figure 11:
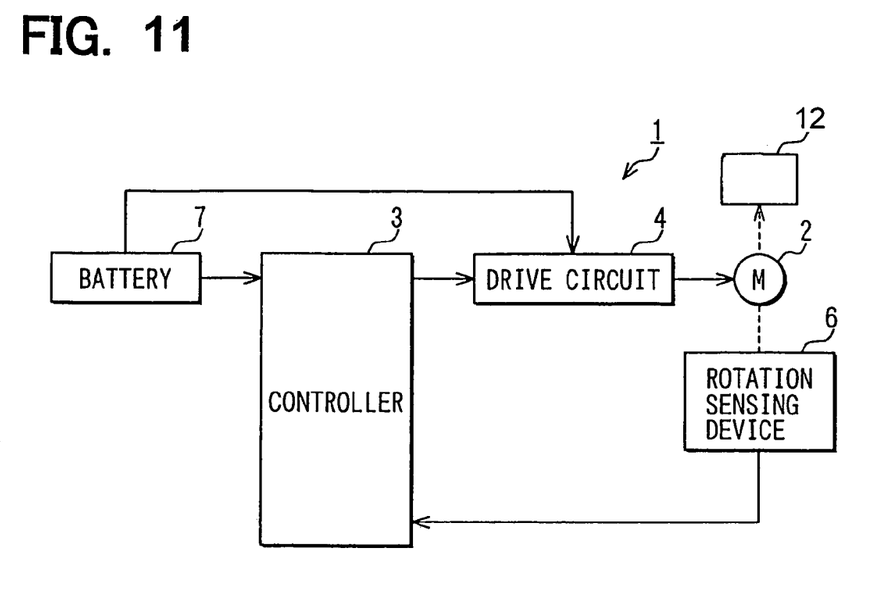
FIG. 11 is a block diagram showing an electrical structure of a vehicle sunroof system in accordance with one or more embodiments.
Figure 12:
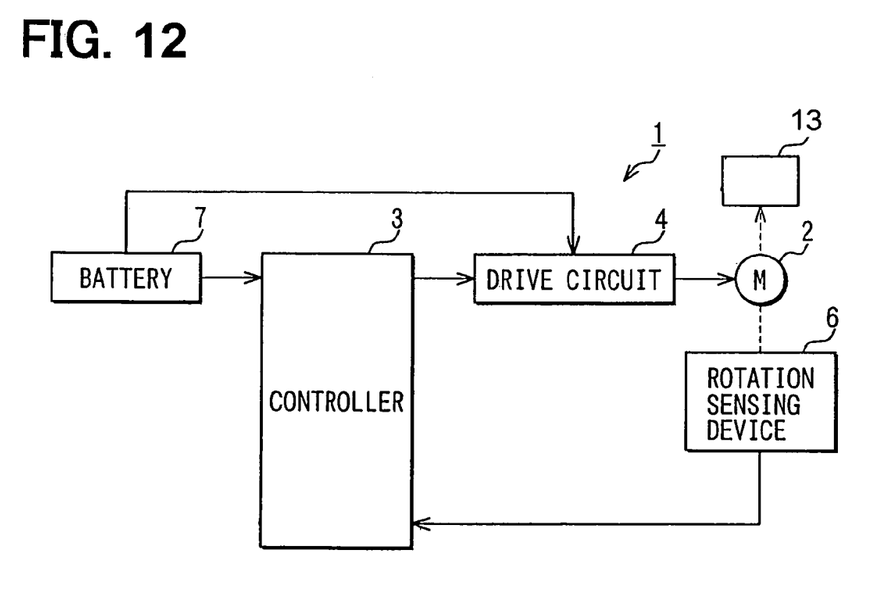
FIG. 12 is a block diagram showing an electrical structure of a vehicle slide door system.

In each of the above embodiments, the present invention is embodied in the vehicle power window system 1, which includes the window glass 11 as the closing member. However, as illustrated in FIG. 11, the present invention is equally applicable to a sunroof system, which includes a sunroof 12 as a closing member, or as illustrated in FIG. 12, to a slide door system, which includes a slide door 13 as a closing member. (In FIG. 11 and FIG. 12, like reference numerals refer to identical or functionally similar elements which have been previously described.) Also, the present invention is equally applicable to any other suitable closing member control system.

Additional advantages and modifications will readily occur to those skilled in the art. The invention in its broader terms is therefore not limited to the specific details, representative apparatus, and illustrative examples shown and described.

What is claimed is:

1. A closing member control system comprising:
   a drive motor, which drives a closing member between a fully open position and a fully closed position;
   a pinching control means for monitoring pinching of an object by the closing member in a closing operation of the closing member toward the fully closed position and for controlling the drive motor in a manner that enables release of the object from the closing member upon occurrence of the pinching of the object by the closing member, wherein the pinching control means determines that the object is pinched by the closing member when the drive motor is decelerated in the closing operation of the closing member, and thereby a change in a rotational speed of the drive motor per unit time decreases below a threshold value in the closing operation;
   a position sensing means for sensing a current position of the closing member; and
   a motor output control means for controlling an output of the drive motor, wherein:
   the motor output control means reduces the output of the drive motor when the closing member reaches a first intermediate position, which is between the fully open position and the fully closed position, in the closing operation of the closing member; and
   the motor output control means increases the output of the drive motor based on a position signal, which is received from the position sensing means and which indicates that the position of the closing member in the closing operation is in a second intermediate position located on a fully closed position side of the first intermediate position, wherein the second intermediate position is located in a pinch-monitoring disabled zone, in which the monitoring of the pinching of the object through the pinching control means is disabled,
   wherein the motor output control means increases the output of the drive motor during a principal predetermined time period, which begins when the drive motor is locked upon arrival of the closing member to the fully closed position.

2. The closing member control system according to claim 1, wherein the motor output control means increases the output of the drive motor when a secondary predetermined time period has elapsed since time of receiving the position signal, which is received from the position sensing means and which indicates that the position of the closing member in the closing operation is in the second intermediate position.

3. The closing member control system according to claim 2, wherein the secondary predetermined time period is adjustable based on an operational condition in the closing operation of the closing member.

4. The closing member control system according to claim 1, wherein the second intermediate position is a preclosed position that is at or adjacent to a resistance increasing point, at which a resistance applied to the closing member is increased.

5. The closing member control system according to claim 1, wherein the motor output control means controls the drive motor such that the output of the drive motor becomes a normal output between the fully open position and the first intermediate position.

6. The closing member control system according to claim 1, wherein the second intermediate position is closer to the fully closed position than the first intermediate position.

7. The closing member control system according to claim 1, wherein the first intermediate position is closer to the fully closed position than the fully opened position.

8. The closing member control system according to claim 1, wherein the motor output control means controls the drive motor such that the output of the drive motor becomes a lower speed output at the first intermediate position.

9. The closing member control system according to claim 1, wherein the motor output control means controls the drive motor such that the output of the drive motor becomes a normal output at the fully closed position.

10. The closing member control system according to claim 1, wherein the closing member is a window glass.

11. The closing member control system according to claim 1, wherein the closing member is a sunroof.

12. The closing member control system according to claim 1, wherein the closing member is a slide door.

* * * * *